3,254,751
LOADING CONVEYOR WITH THIN FLAT SUPPORT AND TABLE MEMBERS
Warren G. Montgomery, Worthington, and William R. Eberle, Westerville, Ohio, assignors to Jeffrey Galion Manufacturing Company, a corporation of Ohio
Filed Feb. 17, 1964, Ser. No. 345,468
7 Claims. (Cl. 198—7)

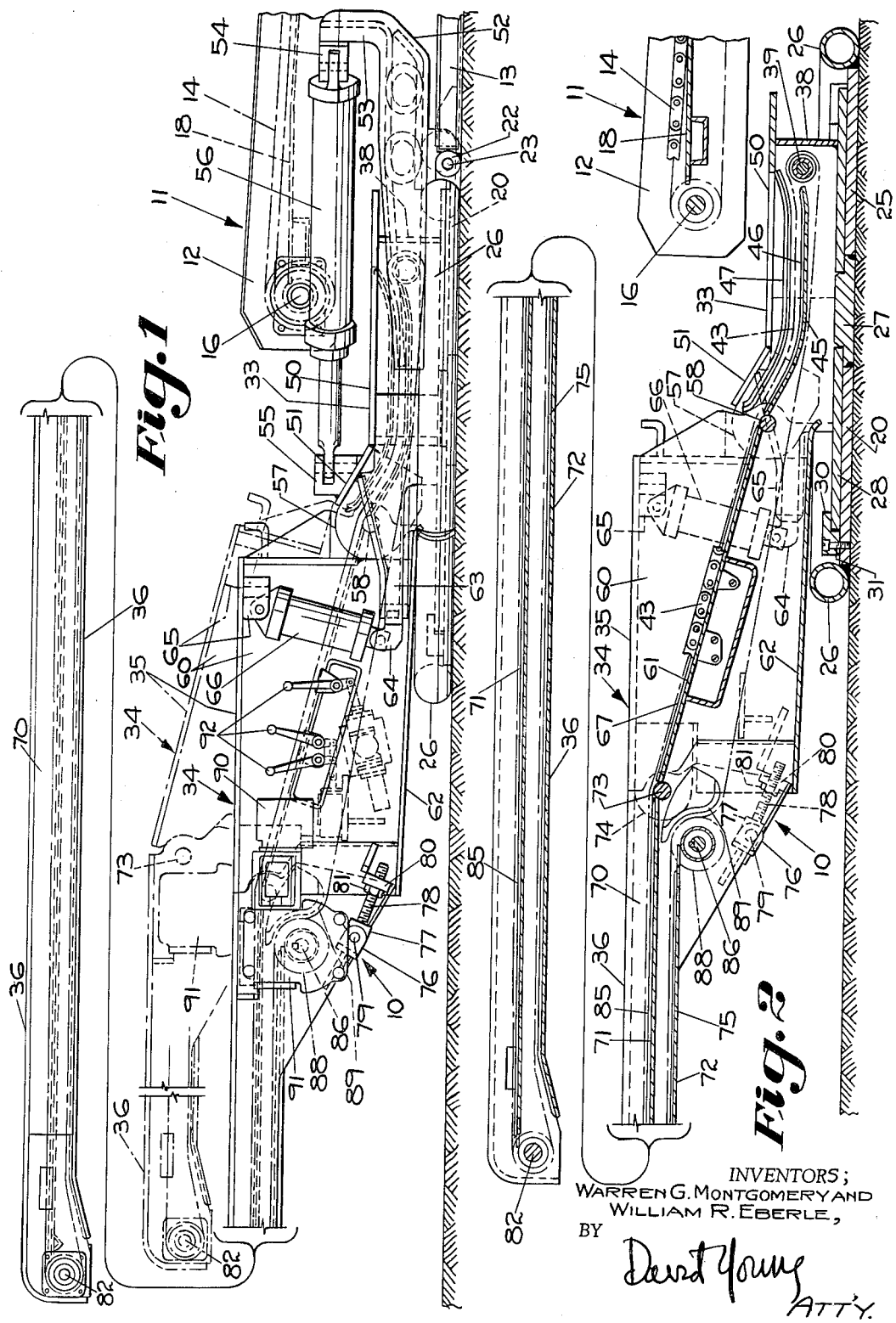
INVENTORS;
WARREN G. MONTGOMERY AND
WILLIAM R. EBERLE,
BY David Young
ATTY.

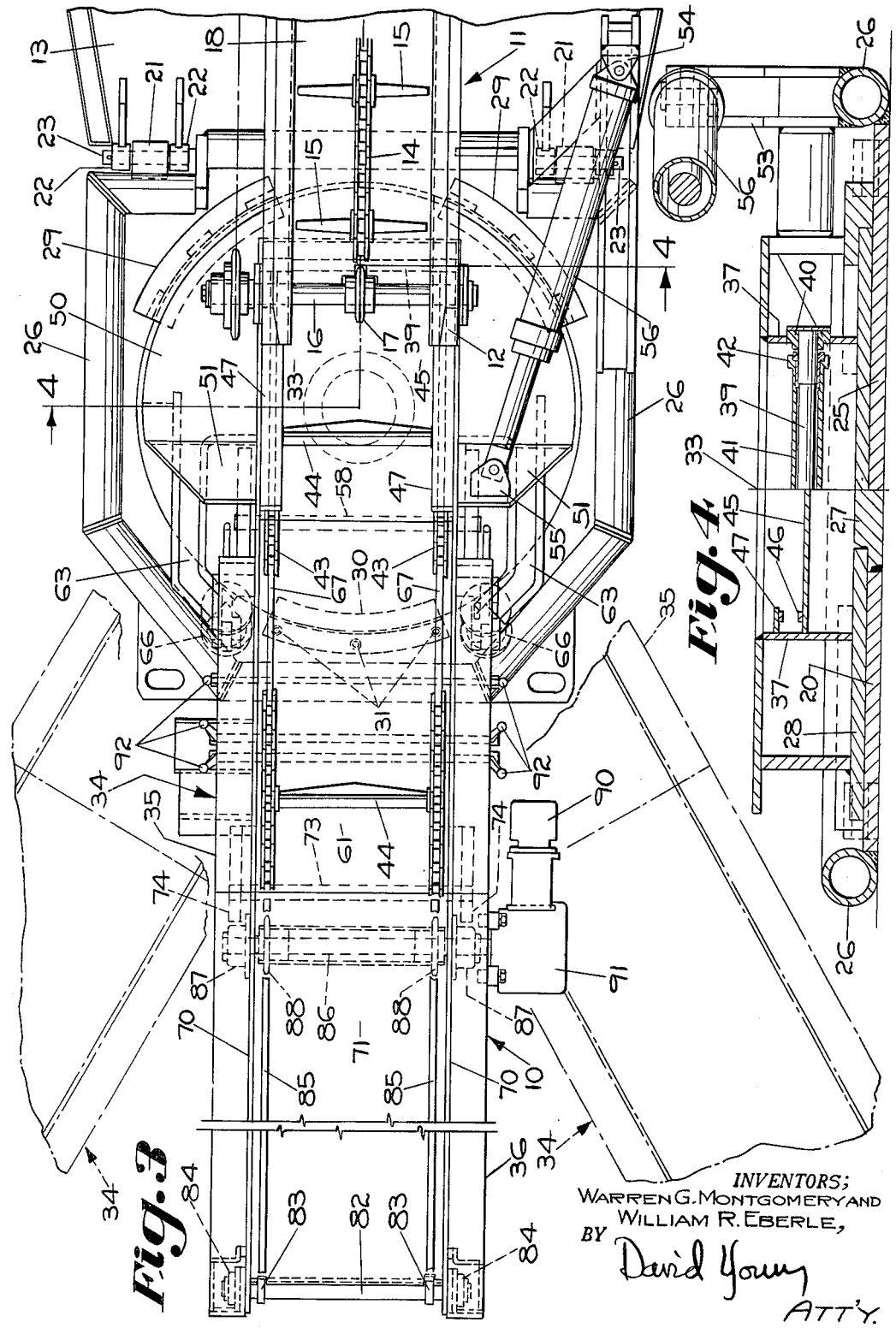

The instant invention relates to a loading conveyor which is particularly adapted for use in underground coal mining operations.

It is an object of the instant invention to provide an improved construction of loading conveyor for receiving material and delivering the same to another conveying means.

It is another object of the instant invention to provide an improved loading conveyor which may be secured to the head end of another conveyor to receive the material discharged by the latter and to load the material onto another conveyance for further movement of the material.

It is a further object of the instant invention to provide an improved loading conveyor having a relatively long and adjustable boom for reaching another conveyance onto which the material is loaded.

It is also an object of the instant invention to provide an improved loading conveyor which may be swung from side to side and may be adjusted in an upright plane to discharge material at a selected position.

Still another object of the instant invention is to provide a loading conveyor of a relatively low height to adapt it for underground mining operations in which the roof height may be relatively low.

Still, a further object of the instant invention is to provide a loading conveyor of simple, but rugged construction to withstand wearing conditions of operation.

Other objects of the instant invention will appear hereinafter, the novel features and combinations being set forth in the appended claims.

In the drawings:

FIG. 1 is a side elevational view of the loading conveyor constructed in accordance with the instant invention;

FIG. 2 is an elevational, sectional view of the loading conveyor, along the center line thereof;

FIG. 3 is a plan view of the loading conveyor; and

FIG. 4 is a sectional view of the loading conveyor, taken on the line 4—4 in FIG. 3.

Referring to the drawings, there is illustrated therein the loading conveyor 10 constructed in accordance with the instant invention. Such loading conveyor may be attached to the head end of a main conveyor 11, for example, a pan conveyor receiving material from a mining machine. The main conveyor 11 has its head end 12 disposed in elevated position above the supporting surface on which the conveyors 10, 11 stand. The main conveyor 11 has a support base 13 which stands on a supporting surface. The conveyor 11 has a conveying means comprising a longitudinally directed endless chain 14, to which are secured a plurality of transversely extending flights 15, 15 extending to opposite sides of the chain 14. There is a driven head shaft 16, with a driving sprocket 17, which engages the chain 14 to move it and the flights 15, 15 along the conveyor 11, whereby the flights 15, 15 engage the material on the bed 18 to move such material. As the chain 14 and its flights 15, 15 pass over and around the shaft 16 and the sprocket 17, the material which is pushed along by the flights 15 is carried to the head end 12 of the conveyor 11 and discharges therefrom.

The loading conveyor 10 has a support base 20 which stands on a supporting surface and is connected to the support base 13 of the conveyor 11. Two laterally spaced lugs 21, 21 are secured to the support base 20, and each lug 21 is disposed between a pair of bosses 22, 22 which are secured to the support base 13. Each lug 21 and its associated bosses 22, 22 has a pin 23 extending through the same to form a hinged connection of the support base 20 to the support base 13. Thus, the respective support bases 13, 20 may bend relatively to each other about the axis of the pins 23, 23 to conform their positions to an uneven supporting surface.

The connection of the support bases 13, 20 to each other causes the conveyors 10, 11 to have a selected disposition relative to each other, and to maintain such disposition for proper discharging movement of the material from the main conveyor 11 to the loading conveyor 10. As will appear hereinafter, the loading conveyor 10 has a boom of substantial length, which extends from the support base 20. In order to maintain the support base 20 on the supporting surface, and to properly dispose the loading conveyor 10, it is necessary that the support base 20 be secured in some manner. This is accomplished by connection of the support base 13 to the support base 20, which in effect provides a weighted means, which counteracts the force on the support base 20 that would otherwise tend to tip the support base 20.

The support base 20 comprises a flat plate base member or table member 25, which may be formed of plate metal that is rigid so as not to be bent out of shape in service. A plurality of metal tubular members 26, 26 are secured to the edges of the flat plate member 25, as by welding, to further strengthen the base or table member 25. The tubular members 26, 26 are substantially higher than the flat base member 25, the height of which is merely the thickness of the plate of which it is formed. The tubular members thus provide a perimetral guard for the base or table member 25. By reason of the circular sectional configuration of the tubular members 26, 26, they also facilitate movement of the loading conveyor 10 by skidding it on its support base 20.

A pivot member 27 is centrally disposed on the support base 20 in a recess in the base or table member 25. The pivot member 27 is fixedly secured to the base member 25, as by welding. A turntable base or table member 28 is seated on the base member 25 in bearing engagement therewith, and is engaged with the pivot member 27 for swinging movement of the turntable base 28 about the axis of the pivot member 27. The turntable base 28 comprises a flat plate member, similar to that of the base member 25. The plate member of the turntable base 28 is preferably formed of metal plate of substantial strength and rigidity to support the conveyor structure which is secured thereto.

A pair of like track members 29, 29 are secured to the base member 25 in laterally spaced positions, as best seen in FIG. 3. The track members 29, 29 overlie the turntable base 28, and thereby hold the turntable base 28 down in bearing engagement with the base member 25. A third track member 30 is secured to the base member 25 at an opposite position with respect to the track members 29, 29. The track member 30 also overlies the turntable base 28 to hold it down in bearing engagement with the base member 25. The track members 29, 29 may be secured to the base member 25 by welding. The track member 30 is secured to the base member 25 by a plurality of bolts 31 to permit removal of the track member 30, which releases the turntable base 28.

The loading conveyor 10 comprises a conveyor hopper section 33 which is secured to the turntable base 28. A conveyor boom 34 is connected to the conveyor hopper section 33 and is supported by the latter and the turntable base member 28. The conveyor boom 34 comprises two conveyor sections, these being the conveyor knuckle section 35 and the conveyor discharge section 36, as will be described in greater detail hereinafter. There is an articulated connection of the conveyor knuckle section 35 to the conveyor hopper section 33, and another articulated connection of the conveyor discharge section 36 to the conveyor knuckle section 35. The articulated connections permit adjustment of the boom 34 as to height and angular disposition, as seen in FIG. 1, in order to discharge material at a selected place.

The conveyor hopper section 33 comprises a pair of side plate members 37, 37, which are laterally spaced with respect to each other to receive material therebetween. An end plate member 38 extends between the side plate members 37, 37 at the right ends thereof, as viewed in FIGS. 1 and 2. The side and end members 37, 37, 38 are disposed in upright positions on the turntable base 28, and are secured thereto, as by welding. Likewise, the end member 38 is secured to the side members 37, 37, as by welding, and together form a box-like compartment in which the material is received as it discharges from the main conveyor 11.

A support shaft 39 is mounted in bosses 40, 40, which are secured one to each side member 37, 37. A tail shaft 41 is rotatably mounted on the support shaft 39. The ends of the tail shaft 41 are formed with wheels 42 which are adapted to engage the side chains 43, 43 of the endless chain and flight conveying device of the loading conveyor 10. A plurality of flights 44 extend transversely between the chains 43, 43 and are secured thereto at longitudinally spaced positions.

A bed member 45 extends transversely between the side members 37, 37 and is secured thereto. At each side of the bed member 45 there is a lower rail 46, which engages a chain 43 to guide the movement thereof. An upper rail 47 is secured to each side member 37 directly above each lower rail 46 and facing the latter. The upper rails 47, 47 engage the chains 43, 43 and hold them down on the rails 46, 46 of the bed 45 so that the conveying flights 44 will be in engagement with the bed 45 as they are moved over the latter. The upper rails 47, 47 are secured to the side members 37, 37, as by welding.

A deck plate member 50 is secured to the side members 37, 37 and the end member 38, at the tops thereof. The deck member 50 is cut out to conform to the spacing between the side members 37, 37 for passage of material into the conveyor hopper section. The perimeter of the deck member 50 is a circular arc that is concentric with the turntable base 28. Overall, the deck member 50 has a somewhat U configuration. At each side of the hopper section 33 there is an extension 51 of the deck plate member 50. The extensions 51, 51 are formed of plate material, as is the deck member 50. The extensions 51, 51 are disposed at an angle, as best seen in FIGS. 1 and 2, and are secured to the side members 37, 37 and the deck member 50, as by welding.

At one side of the support base 20 there is a beam 52, which is secured to the top of a tubular member 26, as by welding. The beam 52 extends beyond the support base 20 towards the support base 13. At the outboard end of the beam 52 there is an upstanding post 53. A bifurcated lug 54 is secured to the post 53. Another bifurcated lug 55 is secured to one extension 51 at the same side of the loading conveyor 10 as the beam 52. The lugs 54, 55 are disposed at the same elevation, and a cylinder and piston mechanism 56 is secured to the respective lugs 54, 55, and is supported thereby. The cylinder and piston mechanism 56 is extensible and retractable, whereby it is operative to swing the turntable base 28 in opposite directions about the axis of the pivot member 27. By extension of the beam 52 beyond the support base 20, provision is made within the space limitations of the loading conveyor 10 for a cylinder and piston mechanism 56 having a sufficiently long stroke to provide the desired range of swinging movement of the turntable base 28 to place the conveyor boom 34 in any of a plurality of positions, for example, as illustrated in FIG. 3.

At each side of the hopper section 33 there is a pivot support 57 secured to the outer side of a side member 37. A laterally disposed pivot 58 has its ends pivotally supported by the opposite pivot supports 57, 57. The pivot supports 57, 57 and the pivot 58 together form an articulated connection of the conveyor knuckle section 35 to the conveyor hopper section 33. The bed member 45 extends closely adjacent to the transverse pivot 58 to minimize any gap at this point.

The conveyor knuckle section 35 comprises opposite side members 60, 60, which are preferably formed of plate material cut to the desired configuration. A flat bed member 61 extends transversely between the side members 60, 60 and is secured to the latter, as by welding. The bed member 61 forms a continuation of the bed member 45. A transverse bottom member 62 extends between the side members 60, 60 and is secured to the latter at their lower edges, as by welding. The side members 60, 60 and the bed member 61 are secured to the transverse pivot 58, whereby the conveyor knuckle section 35 may be moved upwardly and downwardly about the axis of the pivot 58.

At each side of the loading conveyor 10 there is a beam 63 which extends from the conveyor hopper section 33 to a position beyond the pivot 58. The end of the beam 63 is formed with a lug 64. A bifurcated lug 65 is secured to each side of the conveyor knuckle section 35 above a lug 64. A cylinder and piston mechanism 66 is secured to the lugs 64, 65, at each side, and is extensible and retractable to raise and lower the conveyor knuckle section 35 by swinging it upwardly and downwardly about the axis of the laterally disposed pivot 58, thereby adjusting the angular disposition of the conveyor knuckle section 35, as seen in FIG. 1. Each beam 63 is secured to the turntable base 28, to a side member 37, to the deck member 50, and to an extension 51 of the deck member 50, as by welding the elements thereof to each other. Thus, the beam 63 is united with the turntable base 28 and the conveyor hopper section 33.

The conveyor discharge section 36 comprises oppositely disposed side members 70, 70 which are preferably formed of plate material. A bed member 71, preferably formed of plate material, extends transversely between the side members 70, 70 and is secured to the latter, as by welding. A bottom member 72, preferably formed of plate material, extends transversely between the opposite side members 70, 70 and is secured to the latter, as by welding. The bottom member 72 is spaced below the bed member 71.

The conveyor discharge section 36 is connected to the conveyor knuckle section 35 by a pivot 73 that forms an articulated connection of the discharge section 36 to the knuckle section 35. The pivot 73 extends transversely between the side members 70, 70 and is secured to the latter, and is also secured to the bed member 71. A pivot support 74 is secured to each side member 60 of the knuckle section 35. The ends of the pivot 73 are received in the opposite pivot supports 74, 74, which pivotally mount the same. The bed member 61 extends closely adjacent to the transverse pivot 73 to minimize any gap between the bed member 61 and the transverse pivot 73. The bed member 71 of the discharge section 36 forms a continuous extension of the bed member 61 of the knuckle section 35.

The conveyor boom section 36 may be swung upwardly and downwardly about the axis of the pivot 73 to adjust the position thereof relatively to the conveyor knuckle section 35, as seen in FIG. 1. A bifurcated lug 76 is secured to the conveyor boom section 36 at each side thereof. The lug 77 of a jack screw 78 is received in a bifurcated lug 76 on a pivot pin 79. A jack screw 78 extends through a back-up plate 80 secured to a side member 60 of the conveyor knuckle section 35. A nut 81 is threaded on the jack screw 78 and bears against the back-up plate 80. By rotating the nuts 81, 81 on the jack screws 78, 78, at the opposite sides of the conveyor boom 34, the discharge section 36 may be raised or lowered relatively to the knuckle section 35.

At the discharge end of the conveyor discharge section 36 there is a head shaft 82 formed with opposite wheels 83, 83, which engage the opposite chains 43, 43. The head shaft 82 is rotatably supported by flanged bearings 84, 84, which are secured to the opposite side members 70, 70. The chains 43, 43 and the flights 44 move the material to the discharge or head end of the conveyor discharge section 36 and sweep the material over the head shaft 82 for discharge thereof. The chains 43, 43 and the flights 44 travel around the head shaft 82 into the return run thereof. The bed member 61 has rails 67, 67 at the opposite sides thereof, and likewise, the bed member 71 has rails 85, 85 at the sides thereof. The rails 67, 85 are disposed in longitudinal alignment with the lower rails 46, 46 of the bed member 45 in the conveyor hopper section 33. The rails 67, 85 engage the chains 43, 43 of the conveying device to guide the movement thereof along the conveyor knuckle section 35 and the conveyor discharge section 36.

The conveying device comprising the chains 43, 43 and the transverse flights 44 operates in a conveying run which extends from the tail shaft 41 over the bed members 45, 61, 71 to the head shaft 82. At the head shaft 82 the conveying device reverses direction and extends in a return run to the tail shaft 41, at which it again reverses direction to enter the conveying run. The chains 43, 43 and the transverse flights 44 are disposed between the bed member 71 and the bottom member 72 in the return run thereof. The bottom member 72 has opposite rails 75, 75 which engage the chains 43, 43 and guide the movement thereof over the bottom member 72.

At the inner end of the conveyor discharge section 36 there is a driven shaft 86, which is rotatably supported on the side members 70, 70 by bearings 87, 87. A pair of driving sprockets 88, 88 are secured to the driven shaft 86 in laterally spaced positions to engage the chains 43, 43 and to drive the latter. A guide 89 is disposed adjacent each driving sprocket 88 to hold a chain 43 on a sprocket 86, for proper driving engagement. The shaft 86 and the sprockets 88, 88 may be driven by a hydraulic motor 90, which delivers the drive through a transmission 91 that is connected to the driven shaft 86. The transmission 91 is secured to a side member 70 and the motor 90 is secured to the transmission 91. The chains 43, 43 and the flights 44 extend from the sprockets 88, 88 to the tail shaft 41, to be guided by the latter into the conveying run.

The loading conveyor as described herein, includes several hydraulic devices, these being the swing cylinder and piston mechanism 56, the raising and lowering cylinder and piston mechanisms 66, 66, and the hydraulic drive motor 90. These may be supplied with hydraulic fluid under pressure from a tank that is supported on the support base 13 of the adjacent main conveyor 11, and likewise, a motor and pump may be supported on the support base 13 with suitable hydraulic connections extending between the pump and the various hydraulic devices for supplying the hydraulic fluid under pressure. The loading conveyor 10 includes suitable controls 92 for the several hydraulic devices, for operation of the latter. As seen in FIGS. 1 and 3, there are controls 92 at each side of the loading conveyor 10, so that it may be operated from either side.

The loading conveyor 10, constructed in accordance with this invention is constructed in a simple manner with a low minimum height, which particularly adapts the loading conveyor for use in underground coal mining operations, in which the roof height may be low. The loading conveyor 10 has a range of adjustability of the elements thereof which permits the discharge boom to be elevated, as seen in FIG. 1, and to be swung from side to side, as seen in FIG. 3, to properly locate the end thereof to discharge material at a selected place.

Obviously, those skilled in the art may make various changes in the details and arrangement of parts without departing from the spirit and scope of the invention as defined by the claims hereto appended, and applicants therefore wish not to be restricted to the precise construction herein disclosed.

Having thus described and shown an embodiment of the invention, what it is desired to secure by Letters Patent of the United States is:

1. A loading conveyor comprising a support base adapted to stand on a supporting surface, a turntable base seated on the support base, said support base comprising a thin flat table member bearing on the supporting surface, said turntable base comprising a thin flat table member bearing on the thin flat table member of the support base, means for connecting said table member of the turntable base to said table member of the support base for lateral swinging movement of said turntable base on said support base, a conveyor structure mounted on said thin flat table member of the turntable base, said conveyor structure including a conveyor hopper section housing the tail end of the conveyor structure and secured to said table member of the turntable base for receiving material, said thin flat table members of each of said support base and said turntable base being substantially greater in lateral dimension than said conveyor structure, and a conveyor boom extending beyond the turntable base for discharging material to load the material.

2. A loading conveyor as recited in claim 1, in which said table member of said support base comprises a laterally disposed plate, and said table member of said turntable base comprises a laterally disposed plate which is seated on said laterally disposed plate of the support base table member.

3. A loading conveyor as recited in claim 2, a pivot disposed between said turntable base plate and said support base plate, said turntable base plate being of a disc form, and said support base plate having arcuate track elements engaging circumferential portions of said turntable base plate to secure said turntable base plate to the support base plate and to guide the swinging movement of said turntable base plate relatively to said support base plate.

4. A loading conveyor as recited in claim 1, said conveyor hopper section comprising side members that are laterally spaced with respect to each other and between which material is received, means connecting the conveyor boom to said side members, and said connecting means including laterally directed articulated means for selectively positioning the conveyor boom relatively to said conveyor hopper section and said turntable base.

5. A loading conveyor comprising a support base adapted to stand on a supporting surface, a turntable base seated on the support base, said support base including a laterally disposed plate adapted to bear on the supporting surface, said turntable base comprising a laterally disposed plate seated on and bearing on said plate of said support base, means for connecting said plate of the turntable base to said plate of the support base for lateral swinging movement of said turntable base on said support base, a conveyor structure mounted on said turntable base, said conveyor structure including a conveyor hopper section secured to said turntable base plate for receiving material, a conveyor boom extending beyond said turntable base plate for discharging material and to thereby load the material, said hopper including upright side plate members which are laterally spaced to form the opposite sides of the hopper and to receive material therebetween, a deck plate member secured to the tops of said side plate members and extending laterally therefrom, a beam secured to one of said hopper upright side plate members, to said deck plate member and to the turntable base plate and extending beyond said conveyor hopper section, and positioning means connected to said beam and to the conveyor boom for selectively positioning the conveyor boom relatively to the conveyor hopper section.

6. A loading conveyor comprising a support base adapted to stand on a supporting surface, a turntable base seated on the support base, said support base including a laterally disposed plate adapted to bear on the supporting surface, said turntable base comprising a laterally disposed plate seated on and bearing on said plate of the support base, means for connecting said plate of the turntable base to said support base for lateral swinging movement of the turntable base on the support base, a conveyor structure mounted on the turntable base, said conveyor structure including a conveyor hopper section secured to the turntable base plate for receiving material, a conveyor boom extending beyond the turntable base plate for discharging material and to thereby load the material, said hopper including upright side plate members which are laterally spaced to form the opposite sides of the hopper and to receive material therebetween, a deck plate member secured to the tops of said side plate members and extending laterally therefrom, a beam secured to the support base at the perimeter thereof and extending beyond the support base, and positioning means connected to said beam at a place beyond the support base and connected to said hopper deck plate member at one side of said conveyor hopper section and within the perimeter of said support base, said positioning means including an extensible and retractable element for swinging said turntable base and said conveyor structure relatively to said support base.

7. A loading conveyor comprising a support base adapted to stand on a supporting surface, a turntable base seated on the support base, said support base including a laterally disposed plate adapted to bear on the supporting surface, said turntable base comprising a laterally disposed plate seated on and bearing on said plate of said support base, means for connecting said plate of the turntable base to said support base for lateral swinging movement of the turntable base on the support base, a conveyor structure mounted on said turntable base, said conveyor structure including a conveyor hopper section secured to the turntable base plate for receiving material, a conveyor boom extending beyond the turntable base plate for discharging material and to thereby load the material, said conveyor hopper section including upright side plate members which are laterally spaced to form the opposite sides of the hopper and to receive material therebetween, a deck plate member secured to the tops of said side plate members and extending laterally therefrom, a beam secured to the support base at the perimeter thereof and extending beyond the support base, extensible and retractable cylinder means connected to said beam at a place beyond the support base and connected to said hopper deck plate member at one side of said conveyor hopper section and within the perimeter of said support base for swinging said turntable base and said conveyor structure relatively to the support base, said conveyor structure relatively to the support base, said cylinder means being supported by said beam and by said hopper deck member, a second beam secured to a side plate member, to the deck member and to the turntable base plate and extending beyond the hopper section, and a second extensible and retractable cylinder means connected to said second beam and to said conveyor boom for selectively positioning said conveyor boom relatively to said conveyor hopper section.

References Cited by the Examiner

UNITED STATES PATENTS

| | | | |
|---|---|---|---|
| 1,709,082 | 4/1929 | Levin | 198—117 X |
| 1,839,625 | 1/1932 | Whaley | 198—7 |
| 1,997,591 | 4/1935 | Levin | 198—7 |
| 2,189,869 | 2/1940 | Sloane | 198—7 |
| 2,437,629 | 3/1948 | Whaley | 198—7 X |

HUGO O. SCHULZ, *Primary Examiner.*

SAMUEL F. COLEMAN, *Examiner.*

R. E. KRISHER, *Assistant Examiner.*